Sept. 20, 1955

C. L. MOURFIELD 2,718,172

SENSITIZED PAPER MAGAZINE AND FEEDER
FOR PHOTOGRAPHIC ENLARGERS

Filed April 26, 1952

CARL L. MOURFIELD
INVENTOR.

BY

ATTORNEY

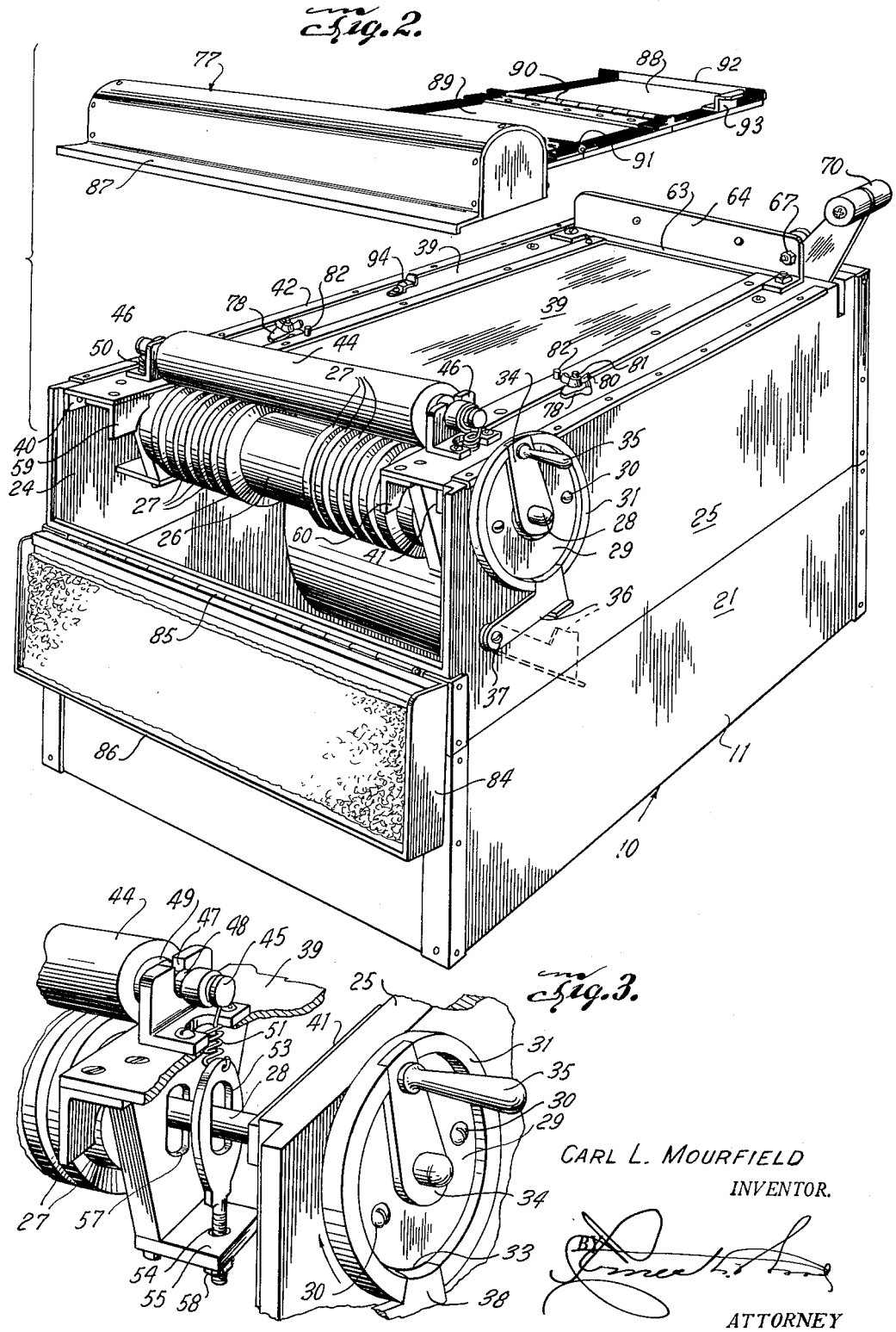

Sept. 20, 1955     C. L. MOURFIELD     2,718,172
SENSITIZED PAPER MAGAZINE AND FEEDER
FOR PHOTOGRAPHIC ENLARGERS
Filed April 26, 1952     4 Sheets-Sheet 3
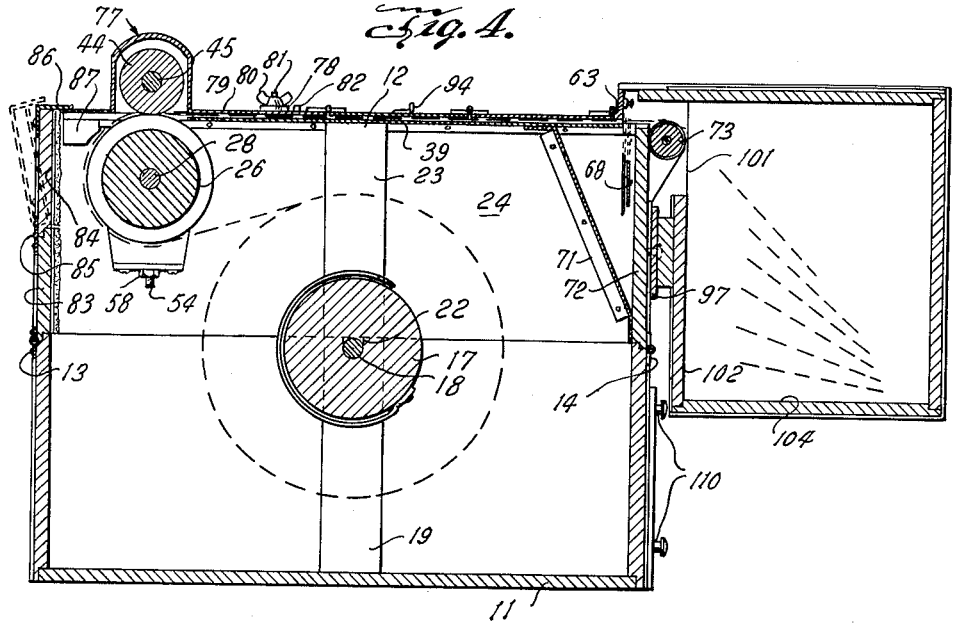
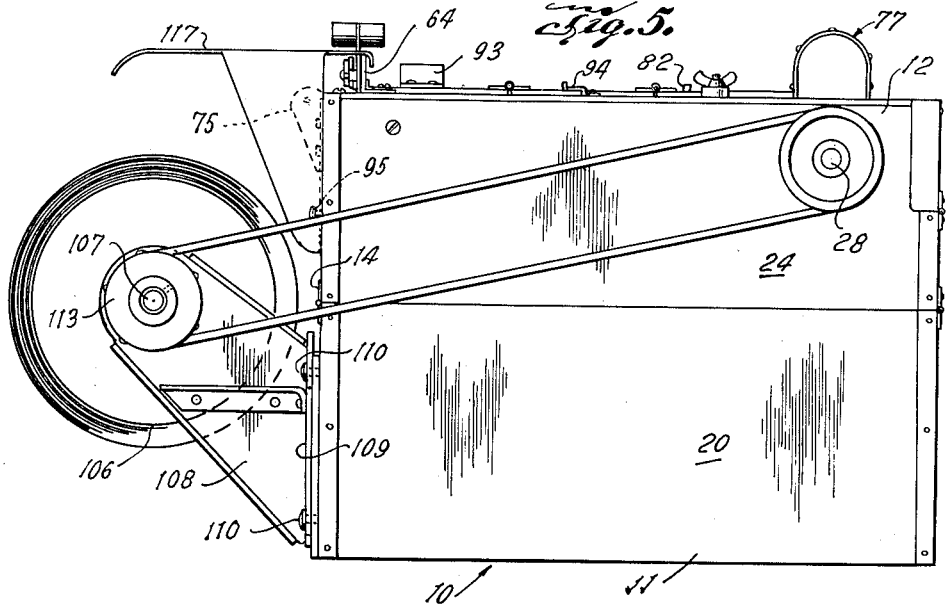
CARL L. MOURFIELD
INVENTOR.
ATTORNEY Sept. 20, 1955 C. L. MOURFIELD 2,718,172
SENSITIZED PAPER MAGAZINE AND FEEDER
FOR PHOTOGRAPHIC ENLARGERS
Filed April 26, 1952 4 Sheets—Sheet 4
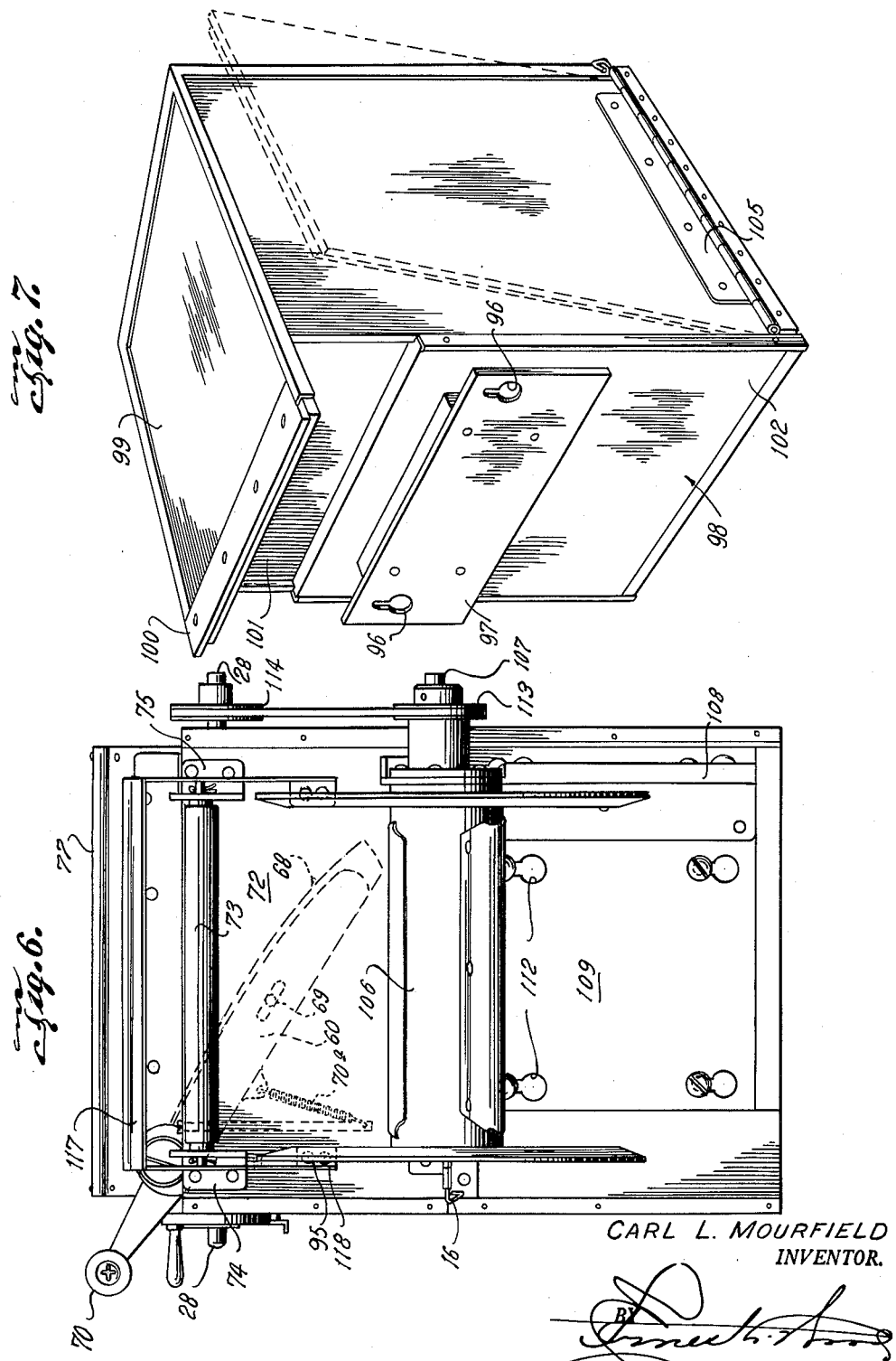
CARL L. MOURFIELD
INVENTOR.
ATTORNEY United States Patent Office 2,718,172
Patented Sept. 20, 1955

2,718,172

SENSITIZED PAPER MAGAZINE AND FEEDER FOR PHOTOGRAPHIC ENLARGERS

Carl L. Mourfield, Dallas, Tex.

Application April 26, 1952, Serial No. 284,539

1 Claim. (Cl. 88—24)

This invention relates to projection printers and more particularly to a magazine and feeder for feeding a flexible strip of suitably sensitized photographic material from a roll held by the magazine in order that images may be projected on successive sections by a suitable projector.

An object of the invention is to provide a new and improved magazine for holding a flexible strip of sensitized photographic material which is provided with a feeder for moving measured successive sections of the strip past a projector which projects light through a transparent picture, either a positive or a negative, on the sections.

It is an object of the invention to provide a new and improved magazine for holding a flexible strip of sensitized photographic material having an adjustable feeder for moving successive sections of preselected lengths of the strip past a projector.

It is still another object of the invention to provide a new and improved magazine for holding a flexible strip of sensitized photographic material having a feeder for moving successive sections of the strip past a projector and a reel on which the exposed sections of the strip are wound.

It is still another object of the invention to provide a new and improved magazine for holding a flexible strip of sensitized photographic material having a feeder for moving successive sections of the strip past a projector, a knife for severing exposed sections from the strip and a magazine for receiving the severed sections.

It is a further object of the invention to provide an adjustable strip feeding mechanism for feeding progressive sections of preselected lengths from a strip.

It is still a further object of the invention to provide a new and improved magazine having a strip feeding mechanism for feeding successive sections of preselected lengths of a strip held by the magazine and a sectional mask for selectively exposing sections of various lengths of the strip.

For a better understanding of the invention, reference may be had to the following description taken in connection with the accompanying drawing and its scope will be pointed out in the appended claim.

In the drawings,

Figure 2 is a perspective view of the magazine illustrated in Figure 1 with a portion of the device displaced upwardly and a door open to reveal details of structure;

Figure 3 is a perspective fragmentary view of the strip feeding mechanism;

Figure 4 is a vertical sectional view of the magazine showing a receptacle attached thereto for receiving severed sections of a strip;

Figure 5 is a side elevation of the magazine showing a reel for winding exposed sections of the strip and a shield, both attached to the magazine;

Figure 6 is an end elevation of the magazine showing the reel for winding exposed sections of the strip from the magazine and the shield attached to the magazine, and Figure 7 is a perspective view of the receptacle for receiving severed sections of the strip.

Figure 1:
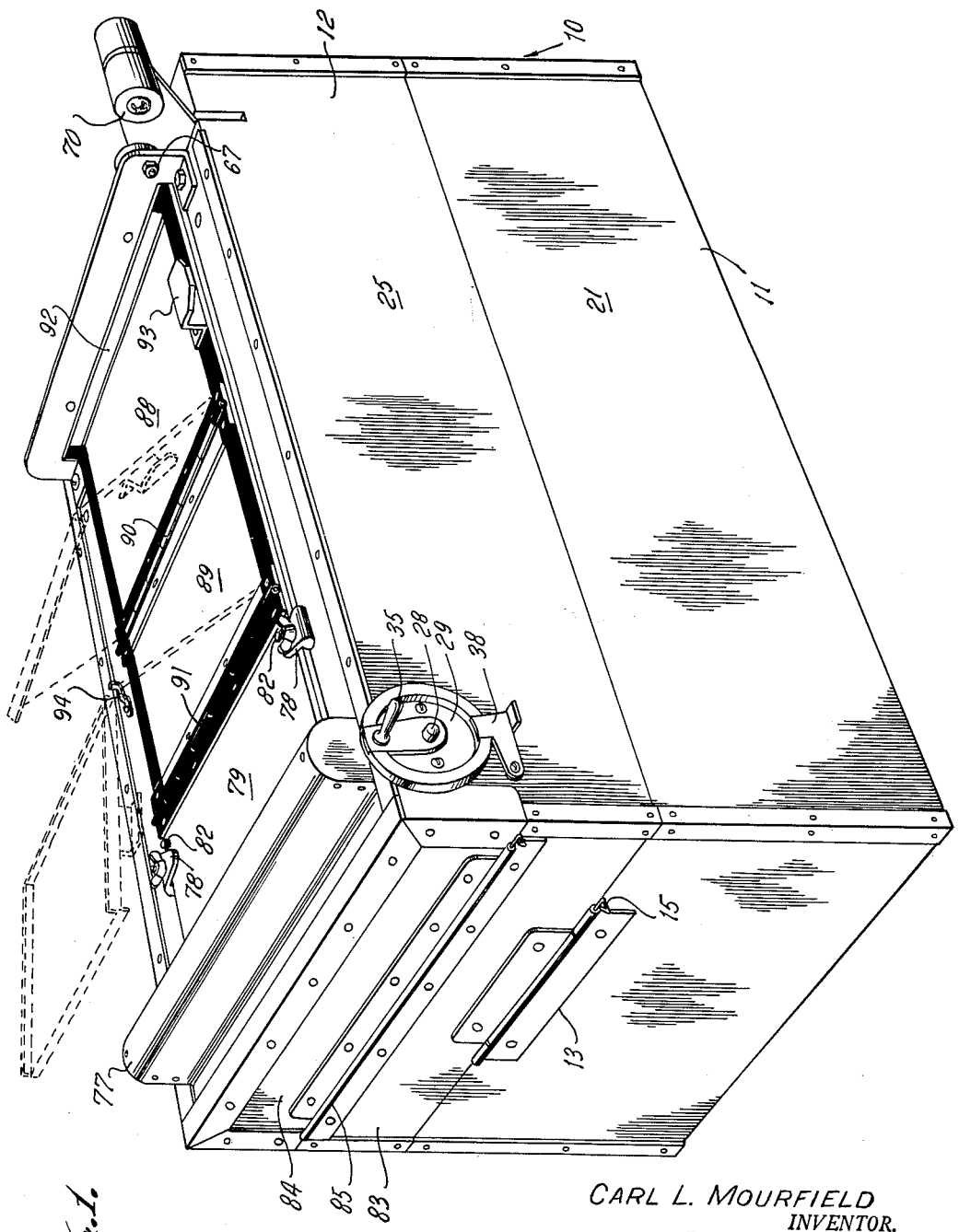
Figure 1 is a perspective view of the magazine of the invention.

Referring now to the drawing, the reference character 10 designates the magazine which has a bottom section 11 and a top section 12 secured together at opposite ends by the hinges 13 and 14. The hinges 13 and 14 have removable hinge pins 15 and 16, respectively, so that the two sections can be separated by removing the hinge pins. Obviously, if only one hinge pin is removed, the top section 12 may be pivoted upwardly about the other hinge pin. It will be seen, then, that the magazine 10 may be readily opened to permit a reel 17 having a shaft 18 to be placed in the magazine. The opposite ends of the shaft are supported by a pair of vertical supports 19, one of which can be seen in Figure 4, abutting opposite sides 20 and 21 of the bottom section. Each support 19 is provided with a slot 22 in its upper end which receives an end of the shaft 18 of the reel 17. Aligned blocks 23, one of which can be seen in Figure 4, secured to the sides 24 and 25 of the top section 12 are aligned with the supports 19 and abut the upper ends thereof to prevent the ends of the shaft from being displaced from the slots 22 in the supports 19 when the top section 12 is in position on the bottom section 11. A roll of flexible material in the form of a strip may be mounted on the reel in the conventional manner.

The strip of flexible material is drawn by and around a feed roller 26 which is provided with a plurality of annular ridges 27 which contact the strip. The feed roller 26 is mounted on a shaft 28 whose opposite ends are journaled in the sides 24 and 25 of the top section 12.

The end of the shaft 28 journaled in the side 25 extends through a central aperture in a circular guide plate 29 which is secured to the side 25 by screws 30. The guide plate 29 is provided with an annular flange 31 provided with two diametrically opposed notches 32 and 33 which are adapted to receive the outer end of a resilient bar 34 which is rigidly secured to the shaft 28. A handle 35 extends outwardly from the bar 34. The bar 34 is sufficiently resilient or flexible that by pulling outwardly on the handle 35 the bar may be moved out of either of the notches 32 or 33 in which it may be disposed and may be moved onto the annular flange 31 as it is rotated in the direction indicated by the arrows in Figures 2 and 3. Since the bar 34 is rigidly connected to the shaft 28, the shaft is also rotated whenever the handle 35 and bar 34 are rotated.

A strap 36 having an end pivoted, as at 37, to the side 25 of the top section 12 is provided with an arm or projection 38 which may be moved into the notch 33 and lie flush with the flange 31. It will now be seen that if the arm 38 is in the notch 33, the handle 35 can be rotated a full 360 degrees after the bar 34 is flexed out of the notch 32 and before it again falls into the notch 32. If the strap 36, however, is pivoted to the broken line position of Figure 2, the handle 35 can be rotated only 180 degrees after the bar 34 is flexed out of one of the notches and before it again falls into the other of the notches. Feed roller 26, therefore, can be selectively rotated either 180 degrees or 360 degrees depending on the position of the strap 36.

The upper periphery of the annular ridges 27 extends slightly above the upper surface of a top plate 39 which extends between the sides 24 and 25 of the top section 12 and rests on the strips 40 and 41 mounted on the sides 24 and 25, respectively, adjacent the upper ends thereof. Strips 42 and 43 fastened to the upper edges of the sides 24 and 25 having inner marginal portions extending over the strips 40 and 41, respectively, to prevent upward displacement of the top plate 39.

A pressure roller 44 having a shaft 45 is rotatably mounted over the feed roller 26 by means of L-shaped brackets 46 secured to the top plate. The opposite ends of the shaft 45 are disposed in the slots 47 of the brackets. Flanges 48 and 49 on each end of the shaft 45 are disposed on opposite sides of the brackets 46 to prevent sidewise movement of the shaft 45.

The pressure roller 44 is yieldingly biased toward the feed roller by a pair of springs 50 and 51 whose upper ends are secured to the ends of the shaft 45 and whose lower ends are secured to tensioning plates 52. Each tensioning plate 52 is provided with a slot 53 through which the shaft 28 of the feed roller 26 extends and a threaded rod 54 which extends through an aperture in a horizontal flange 55 secured to a dependent lug 56 secured to the top plate 39. Each lug 56 is also provided with an aperture 57 through which the shaft 28 extends. A nut 58 on each rod 54 may be rotated to vary the tension on the spring 50 and 51 and thus vary the force with which the pressure roller is yieldingly biased toward the feed roller 26.

A pair of guide brackets 59 and 60 are secured to the top plate 39 adjacent opposite ends of the feed roller 26 to guide the strip of sensitized material as it is drawn from the reel 17 around the feed roller 26 and between the pressure roller 44 and the feed roller. The strip is pressed against the annular ridges 27 by the feed roller so that the frictional engagement of the ridges with the strip will cause the strip to be unwound off the reel 27 as the feed roller is rotated by the handle 35.

The strip moves over the top plate 39 between two guide strips 61 and 62 mounted on the upper surface of the top plate.

The strip is moved beneath the flange 63 of a stationary vertical plate 64 having ears 65 by means of which the stationary bar is rigidly mounted on the top plate 39. A knife 66 pivotally mounted on the stationary vertical plate 64 by a bolt 67 and having a blade 68 adjustably secured to it by a bolt and slot connection 69 cooperates with the stationary vertical plate to cut the strip each time the knife is pivoted about the bolt 67. The knife is provided with a handle 70. A spring 70b may be employed to bias the knife downwardly.

The knife 66 extends into the top section and a plate 71 is therefore provided in the top section 12 which extends between the end 72 of the top section and the top plate 39 to prevent passage of light into the interior through the elongate aperture between the top plate 39 and the end 72 in which the knife 66 is movable.

A roller 73 is mounted on the outside surface of the end 72 by means of brackets 74 and 75. The roller 73 serves to guide the strip as it moves away from the magazine.

A housing 77 is detachably mounted on the top plate 39, by means of clips 78 which are adapted to extend over the flat portion 79 of the housing and are held thereagainst by wing nuts 80 on the threaded studs 81 mounted on the top plate 39 which extend through suitable apertures in the clips. A pair of studs 82 extend upwardly from the guide strips 61 and 62 and through apertures in the flat portion 79 of the housing also serves to hold the housing in proper position on the top plate 39.

The end 83 of the top section 12 is provided with a door 84 secured to the end 83 by a hinge 85. The door 84 has a flange 86 which overlaps the end portion 87 of the housing 77 when the door is in closed position. All other joints are similarly made light tight by having each joined element overlap the other.

A mask comprising two plates 88 and 89 connected by a hinge 90 is secured to the flat portion 79 of the housing 77 by a hinge 91. The mask extends from the housing to the stationary plate 64 and the plate 88 is provided with a flange 92 which abuts the stationary plate when the mask is fully closed. A handle 93 is secured to the plate 88 so that the plate 88 may be easily lifted. A clip 94 secured to the top plate 39 is used to hold the plate 89 in closed position when small prints are to be made.

The end 72 of the top section 12 is provided with a pair of outwardly extending screws 95 which are adapted to extend through the keyhole slots 96 of a hanging plate 97 on a receptacle 98, Figures 4 and 7. The receptacle has a top 99 provided with an extension 100 which extends over and abuts the top edge of the stationary plate 64 to prevent light from passing therebetween. The aperture 101 between the top 99 and the top edge of the side 102 of the receptacle is disposed adjacent the guide roller 73 so that sections of the strip will fall into the receptacle 98 as they are severed from the strip by the knife 66.

The side 103 is secured to the bottom 104 by a hinge 105 so that the side 103 may be pivoted outwardly to allow the severed sections of the strip to be removed from the receptacle.

In use, a roll of the strip of sensitized material is mounted on the reel 17 which is then placed in the bottom section 11 with the ends of its shaft 18 rotatably supported in the slots 22 of the supports 19. The top section 12 is then secured to the bottom section 11. The door 84 may then be opened and the free end of the strip placed between the feed roller 26 and the pressure roller 44. The feed roller may be rotated by means of the handle 35 to cause the strip to unwind off the reel 17 and move over the top plate 39 between the guide strips 61 and 62. When the strip has been advanced until it projects beyond the stationary vertical plate 64, the knife 66 is pivoted to trim off any excess margin of the strip.

A projector is then positioned above the plate 88 if small prints or enlargements are to be made and image of a picture is centered on the plate 88 whose margin may be painted black to indicate the area on which the picture must be centered. The plate 88 is then pivoted upwardly and the image is projected on the section of the strip thus exposed for an appropriate length of time. The projector may then be shut off or closed and the handle 35 is then rotated until the bar moves from one notch 32 or 33 into the other, the stop 36 being in the broken line position indicated in Figure 2 so that the feed roller 26 rotates only 180 degrees. This rotation of the feed roller causes exposed section of the strip to be moved toward and into the receptacle 98 and to cause an unexposed section of the strip to be moved into the place formerly occupied by the exposed section. The knife 66 is then pivoted upwardly and the exposed section is severed and falls into the receptacle. This process can be repeated until the desired number of prints or enlargements of the picture is obtained. The exposed and severed sections of the strip can be removed from the receptacle by pivoting the side 103 outwardly on its hinge 105.

If it is desired to make larger prints, the slip 94 is released and the plate 89 is pivoted upwardly about its hinge 91 so a larger section of the strip will be exposed. The strap 36 is moved upwardly so that its arm 38 is disposed in the notch 33. The handle 35 can now be rotated 360 degrees so that the length of each section will be twice as large as previously.

It will be apparent that the use of the circular guide plate provided with the notches permits the lengths of the sections of the strip to be preselected and that the operator can operate the feed roller in darkness since the stop 34 will fall into a notch each time the strip has been advanced the proper distance by the rotation of the feed roller.

The receptacle 98 may be employed by photographers who do not possess a continuous developer. In Figures 5 and 6 are shown attachments which permit the exposed sections to be wound on another reel 106, the strip wound on the reel 106 being developed after a plurality of sections thereof have been successively exposed. The reel 106 has its shaft 107 rotatably mounted on a side plate 108 which is secured to a hanging plate 109 by bolts or rivets 110. A reinforcing brace 111 may be secured to the side plate 108.

The hanging plate 109 is provided with keyhole slots 112 by means of which the hanging plate 109, and therefore the reel 106, may be attached to the magazine. A pulley 113 secured to shaft 107 of the reel is connected to a pulley 114 on the shaft 28 of the reel 17 by an endless spring 115. It will be apparent that each time the handle 35 is rotated to advance the strip, the reel also will be rotated to wind up the exposed sections of the strip thereon. The spring 115 will slip about the pulleys if the strip is subjected to excessive tension.

A shield 117 which extends from the stationary vertical plate over the reel 106 is mounted on the screws 95 by means of the keyhole slots 118. The shield prevents stray light from the projector from falling on the strip as it is wound on the reel 106.

The strip is successively advanced in the manner described above with the exposed sections of the strip being wound on the reel 106 as the printing or enlarging continues. When the printing or enlarging is finished, the exposed section of the strip wound on the reel 106 is severed from the unexposed sections of the strip by the knife 66. The exposed continuous strip is then developed by conventional processes.

It will be apparent now that a new and improved magazine 10 has been provided which is constructed in two sections 11 and 12 which may be easily detached from one another. Moreover, it will be seen that a strip of paper may be wound from a reel 17 and easily successively advanced by preselected lengths past a projector by means of a feed roller 26 and pressure roller 44. Furthermore, a mask having two plates 88 and 89 has been provided which permits the sensitizing of areas of preselected sizes and the strip depending on the preselected length of the section of the strip fed past the mask upon each operation of the feed roller.

The flange 31 of the circular guide plate 29 may be provided with more than two notches and more than one strap 36 if it is desired to make prints or enlargements of more than two sizes.

Among the advantages of the described magazine and feeding mechanism are its simplicity of structure and operation, ready accessibility of all operating elements for repair or adjustment, and the adjustability of the various operative elements to produce prints or enlargements of different preselected sizes.

Manifestly, the construction as shown and described is capable of some modification and such modification as may be construed to fall within the scope and meaning of the appended claim is also considered to be within the spirit and intent of the invention.

What is claimed is:

A device of the type described comprising a magazine, said magazine including a top section and a bottom section; means detachably securing said top and bottom sections together, a reel for holding a roll of sensitized paper mounted in said magazine, said top section including a top plate, a pair of sides and a pair of ends, one of said ends having a pivoted upper portion; a feed roller having its shaft journalled in said sides adjacent one end of said top plate and having a peripheral portion substantially on the same level as said top plate, said pivoted upper portion of one of said ends being adapted to expose said feed roller when open; a pressure roller mounted on said top plate above said feed roller; means yieldingly biasing said pressure roller toward said feed roller; means for rotating said feed roller a preselected distance during each operation thereof, said strip extending between said roller and being held therebetween whereby rotation of said feed roller moves said strip between said roller over said top plate.

References Cited in the file of this patent

UNITED STATES PATENTS

| | | |
|---|---|---|
| 1,113,646 | Jones | Oct. 13, 1914 |
| 1,344,207 | Miles | June 22, 1920 |
| 1,353,690 | Wilson | Sept. 21, 1920 |
| 1,801,458 | Satterlee | Apr. 21, 1931 |
| 1,939,243 | Twyman | Dec. 12, 1933 |
| 2,140,445 | Mihalyi | Dec. 13, 1938 |
| 2,208,725 | Homrich | July 23, 1940 |
| 2,518,347 | Mandel | Aug. 8, 1950 |
| 2,524,941 | Taylor | Oct. 10, 1950 |
| 2,533,099 | Earhart | Dec. 5, 1950 |
| 2,592,735 | Pirmov | Apr. 15, 1952 |

FOREIGN PATENTS

| | | |
|---|---|---|
| 545,257 | Germany | June 19, 1933 |